No. 868,254. PATENTED OCT. 15, 1907.
F. DANIEL.
WATER ALARM APPARATUS FOR VESSELS.
APPLICATION FILED JUNE 10, 1907.
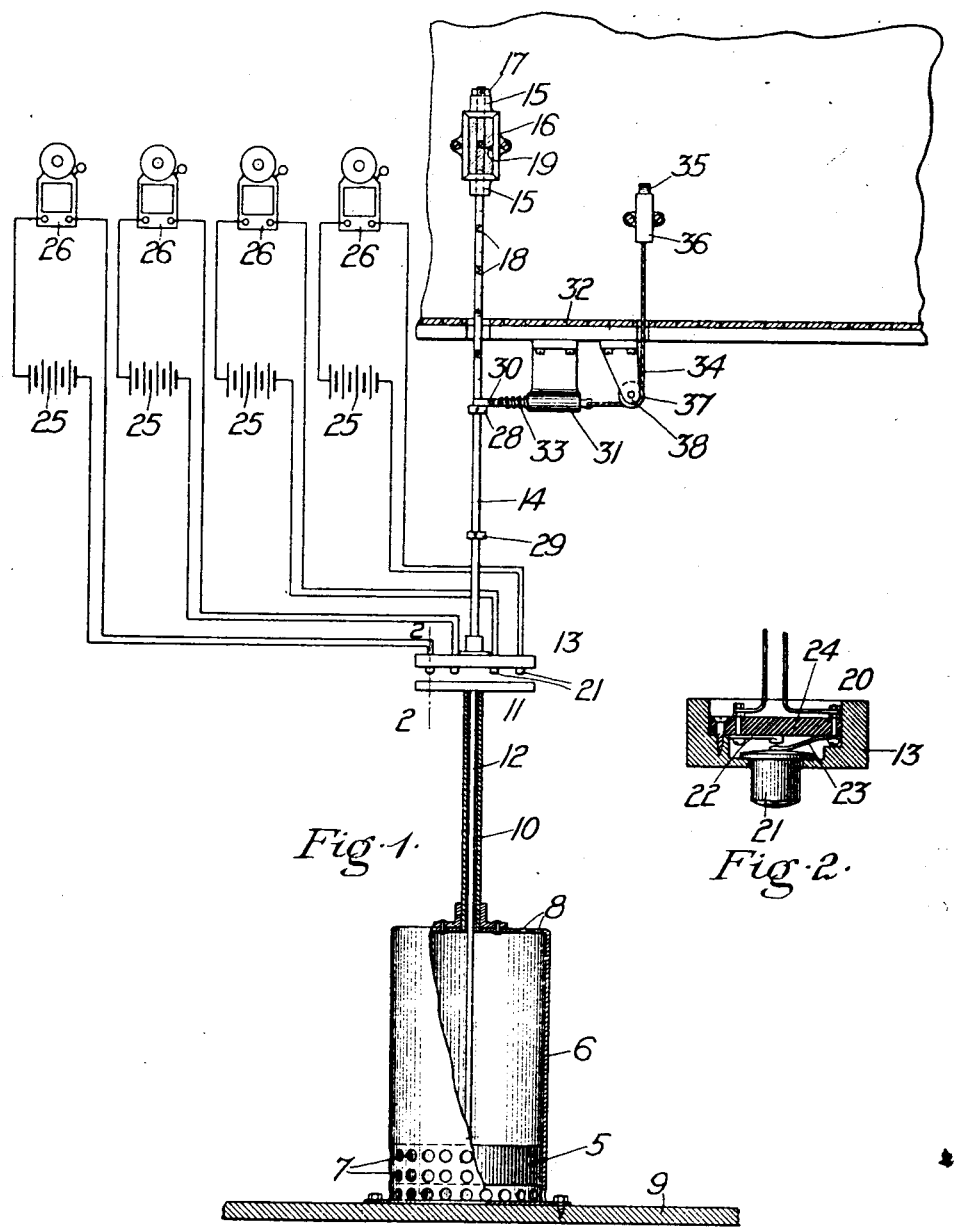

UNITED STATES PATENT OFFICE.

FRANCIS DANIEL, OF WEST SOMERVILLE, MASSACHUSETTS.

WATER-ALARM APPARATUS FOR VESSELS.

No. 868,254.  Specification of Letters Patent.  Patented Oct. 15, 1907.

Application filed June 10, 1907. Serial No. 378,079.

*To all whom it may concern:*

Be it known that I, FRANCIS DANIEL, a citizen of the United States, residing at West Somerville, in the county of Middlesex and State of Massachusetts, have invented new and useful Improvements in Water-Alarm Apparatus for Vessels, of which the following is a specification.

This invention relates to improvements in water alarm apparatus for vessels, and the object is to provide an apparatus which by the ringing of a bell or the actuating of any other suitable alarm device will notify those in charge of the vessel that water is collecting in the hold, and the object is further to provide a scale for indicating the amount of water in the hold.

The invention consists in the combination and arrangement of parts set forth in the following specification and particularly pointed out in the appended claims.

Referring to the drawings: Figure 1 is an elevation, partly in section, of my apparatus. Fig. 2 is an enlarged detail section, partly in elevation, of one of the circuit closers taken on line 2—2 of Fig. 1.

Like numerals refer to like parts throughout the several views of the drawings.

In the drawings, 5 is a float arranged to move vertically in a casing 6, said casing being provided with a plurality of openings 7 near the bottom thereof and a plurality of openings 8 in the top thereof. The casing 6 is secured to the bottom 9 of the vessel, said casing being located in practice in the hold of the vessel. A tube 10 is fast to the casing 6 and extends upwardly therefrom. A vertically movable member 11 is provided with a rod 12 adapted to slide in the tube 10, said rod being fast to the float 5. A second vertically movable member 13 is located above the member 11 and is provided with a rod 14 which is adapted to slide in guides 15, 15 formed in an indicator casing 16. A collar 17 fast to the rod 14 normally rests on the upper guide 15 and supports the member 13 in the position shown. The rod 14 is provided with a plurality of graduations 18 and the indicator casing 16 supports an indicator hand 19. The indicator casing 16 may be supported by any suitable support such, for instance, as the side of a cabin.

A plurality of circuit closers 20 are supported on the member 13. The circuit closers 20 are all identical in construction and the following description of one of them will be sufficient for all. A push button 21 is slidably mounted in the member 13 and is adapted to move vertically therein. Two electrodes 22 and 23 are supported on an insulating plate 24 in the member 13, the electrode 23 constituting a spring which normally presses the push button 21 downwardly as shown in Fig. 2, so that said electrodes are normally out of contact with each other. The electrodes 22 and 23 are arranged in circuit with a source of electrical current 25 and an electric alarm device 26, said device in this instance being an electric bell. When the push button 21 is pressed upwardly as hereinafter described the electrode 23 is moved into contact with the electrode 22 and the circuit being thus completed the bell 26 is rung.

Two collars 28 and 29 are fast to the rod 14. A slide 30 is normally located above the collar 28, as shown in Fig. 1, said slide being slidably mounted in a bracket 31 supported in any suitable manner, the support in this instance being the deck 32 of the vessel. A compression spring 33 is adapted to normally hold the slide 30 in the position shown and the rod 14 is thereby locked against upward movement. The slide 30 is connected by a cord 34 to a hook 35 slidably mounted in a casing 36, said cord passing part way around a sheave wheel 37 journaled on a bracket 38.

The general operation of the apparatus hereinbefore specifically described is as follows: The normal position of the parts is as shown in the drawing. If the vessel springs a leak and water begins to rise in the hold, said water enters the openings 7 in the casing 6 and causes the float 5 to rise. As the float 5 rises the member 11 is moved into contact with the buttons 21 and as the slide 30 prevents the member 13 from rising the electrodes or springs 23 yield and the circuits are completed to the various bells 26 which in practice I prefer to have located in various parts of the vessel. As the water continues to rise, the bells 26 continue to ring. The proper officer of the ship upon hearing the bell or bells ring and wishing to ascertain the amount of water in the hold pulls upwardly on the hook 35, thereby acting through the cord 34 to withdraw the slide 30 from engagement with the collar 28 and the member 13 at once rises under the influence of the float 5 and the indicator hand 19 indicates by the graduations 18 the amount of water in the hold.

The tension of the spring electrodes 23 is preferably such that the weight of the member 13 is not sufficient to cause the bells 26 to be rung at this time. As the water continues to rise in the hold of the vessel the collar 29 will come into contact with the under side of the slide 30 and thereupon the bells 26 will again be rung. The wires leading to the circuit closers 20 will in practice be suitably arranged to permit the up and down movement of the member 13.

Having thus described my invention what I claim and desire by Letters Patent to secure is:

1. In an apparatus of the character described, a vertically movable float, a casing surrounding said float, said casing provided with openings, a tube extending upwardly from said casing and fast thereto, a member having a vertical rod located in said tube and fast to said float, a source of electrical current, an electric alarm device in circuit with said source of current, a circuit closer constructed to close said circuit, said circuit closer being located above said member, and a second vertically movable member on which said circuit closer is supported.

2. In an apparatus of the character described, a vertically movable float, a casing surrounding said float, said casing provided with openings, a tube extending upwardly from said casing and fast thereto, a member having a vertical rod located in said tube and fast to said float, a source of electrical current, an electric alarm device in circuit with said source of current, a circuit closer constructed to close said circuit, said circuit closer being located above said member, a second vertically movable member on which said circuit closer is supported, and means to normally hold said second member against upward movement.

3. In an apparatus of the character described, a vertically movable float, a casing surrounding said float, said casing provided with openings, a tube extending upwardly from said casing and fast thereto, a member having a vertical rod located in said tube and fast to said float, a source of electrical current, an electric alarm device in circuit with said source of current, a circuit closer constructed to close said circuit, said circuit closer being located above said member, a second vertically movable member on which said circuit closer is supported, means to normally engage and hold said second member against upward movement, and means to withdraw said first means from engagement with said second member.

4. In an appaartus of the character described, a vertically movable float, a member having a vertical rod fast to said float, a source of electrical current, an electric alarm device in circuit with said source of current, a circuit closer constructed to close said circuit, said circuit closer being located above said member, a second vertically movable member on which said circuit closer is supported, and means to normally hold said second member against upward movement.

5. In an apparatus of the character described, a vertically movable float, a member having a vertical rod fast to said float, a source of electrical current, an electric alarm device in circuit with said source of current, a circuit closer constructed to close said circuit, said circuit closer being located above said member, a second vertically movable member on which said circuit closer is supported, means to normally hold said second member against upward movement, and means to withdraw said first means from engagement with said second member.

6. In an apparatus of the character described, a vertically movable float, a member having a vertical rod fast to said float, a source of electrical current, an electric alarm device in circuit with said source of current, a circuit closer constructed to close said circuit, said circuit closer being located above said member, a second vertically movable member on which said circuit closer is supported, said second member being provided with a scale thereon, and an indicator hand located adjacent to said scale.

7. In an apparatus of the character described, a vertically movable float, a member having a vertical rod fast to said float, a source of electrical current, an electric alarm device in circuit with said source of current, a circuit closer constructed to close said circuit, said circuit closer being located above said member, a second vertically movable member on which said circuit closer is supported, a collar on said second member, a locking slide normally located above said collar, and means to withdraw said slide out of the path of movement of said collar.

8. In an apparatus of the character described, a vertically movable float, a member having a vertical rod fast to said float, a source of electrical current, an electric alarm device in circuit with said source of current, a circuit closer constructed to close said circuit, said circuit closer being located above said member and normally separated therefrom by a space, a second vertically movable member on which said circuit closer is supported, means to normally support said second member and normally hold said device out of contact with said first member, and means to normally hold said second member against upward movement.

9. In an apparatus of the character described, a vertically movable float, a member having a vertical rod fast to said float, a source of electrical current, an electric alarm device in circuit with said source of current, a circuit closer constructed to close said circuit, said circuit closer being located above said member and normally separated therefrom by a space, a second vertically movable member on which said circuit closer is supported, a collar on said second member, a locking slide normally located above said collar, and means to move said slide out of the path of movement of said collar.

In testimony whereof I have hereunto set my hand in presence of two subscribing witnesses.

FRANCIS DANIEL.

Witnesses:
 LOUIS A. JONES,
 ANNIE J. DAILEY.